(12) United States Patent
Alonzo et al.

(10) Patent No.: US 12,007,064 B1
(45) Date of Patent: Jun. 11, 2024

(54) UNIVERSAL SUPPORT STAND FOR PORTABLE ELECTRONIC DEVICES

(71) Applicants: Reynaldo V Alonzo, Fresno, CA (US); Nina Seyedabadi, Fresno, CA (US)

(72) Inventors: Reynaldo V Alonzo, Fresno, CA (US); Nina Seyedabadi, Fresno, CA (US)

(*) Notice: Subject to any disclaimer, the term of this patent is extended or adjusted under 35 U.S.C. 154(b) by 657 days.

(21) Appl. No.: 17/118,967

(22) Filed: Dec. 11, 2020

(51) Int. Cl.
| | | |
|---|---|---|
| *F16M 11/20* | (2006.01) | |
| *F16M 11/22* | (2006.01) | |
| *G06F 1/16* | (2006.01) | |
| *F21V 23/04* | (2006.01) | |
| *F21Y 115/10* | (2016.01) | |

(52) U.S. Cl.
CPC ......... *F16M 11/2014* (2013.01); *F16M 11/22* (2013.01); *G06F 1/1632* (2013.01); *F16M 2200/08* (2013.01); *F21V 23/04* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 7,342,162 | B2 * | 3/2008 | Tai | G10G 5/00 84/327 |
| 7,969,732 | B1 * | 6/2011 | Noble | F16M 11/10 361/679.55 |
| 8,568,154 | B2 * | 10/2013 | Chang | H01R 13/6315 439/173 |
| 9,605,790 | B1 | 3/2017 | Alonzo et al. | |
| 9,620,972 | B2 * | 4/2017 | Oh | G06F 1/1632 |
| 10,551,873 | B2 * | 2/2020 | Han | G06F 1/1632 |
| 10,739,822 | B2 * | 8/2020 | Choi | G06F 1/1632 |
| 2013/0277529 | A1 * | 10/2013 | Bolliger | A47B 21/0314 248/676 |
| 2014/0268542 | A1 * | 9/2014 | Moon | H01R 13/44 361/679.41 |
| 2017/0241590 | A1 * | 8/2017 | Boubli | G06F 1/1632 |
| 2019/0036359 | A1 * | 1/2019 | Smith | H02J 7/02 |
| 2019/0228753 | A1 * | 7/2019 | Wheeler | G10G 7/005 |
| 2019/0369593 | A1 * | 12/2019 | Murakami | G06V 10/24 |

* cited by examiner

*Primary Examiner* — Xanthia C Relford
(74) *Attorney, Agent, or Firm* — Kenneth L. Tolar

(57) ABSTRACT

A support stand for portable electronic devices includes a substantially circular base component having an upper surface, a lower surface and a continuous periphery surrounding a central aperture. On the upper surface are a pair of transverse channels with a plurality of semi-cylindrical grooves therein that are each positioned at a discrete, oblique angle relative to a vertical plane. Each channel includes an inclined inner wall that, in combination with one of the grooves, uprightly supports a portable electronic device at a distinct angle. Any one of a plurality of interchangeable attachments are securable to the lower surface of the base component that allow the device to rotate, depict promotional materials and aesthetic elements, or illuminate the electronic device.

17 Claims, 6 Drawing Sheets

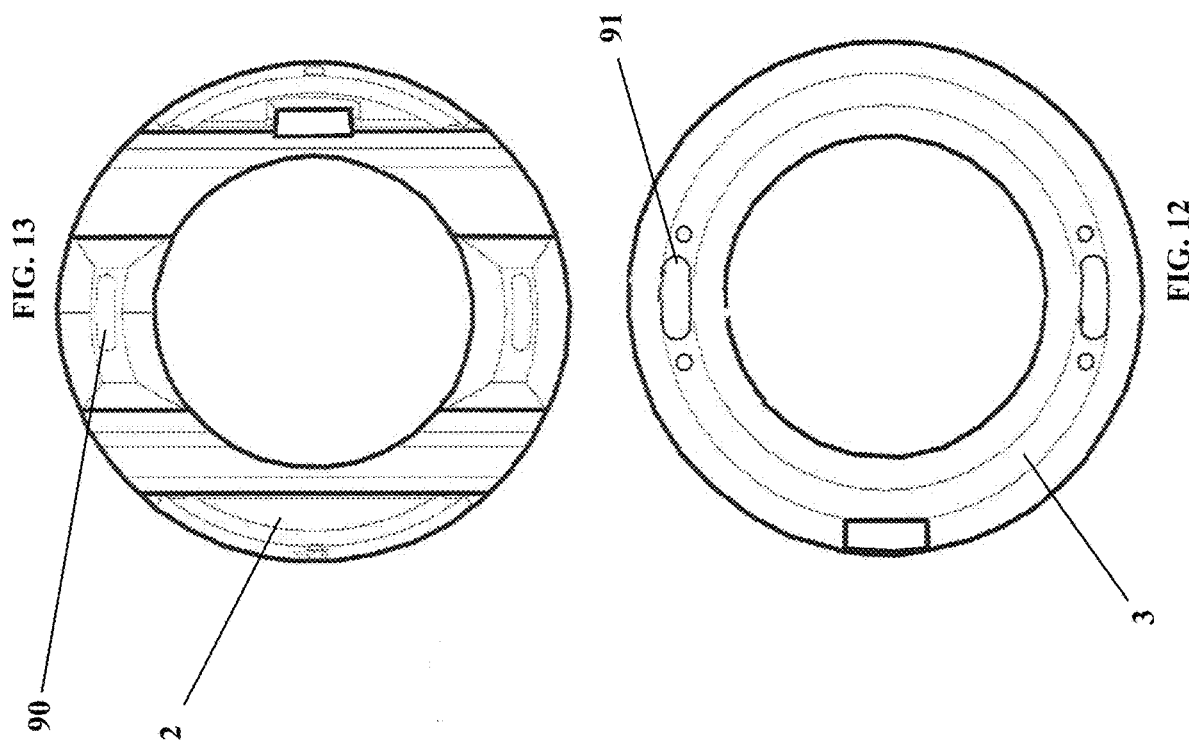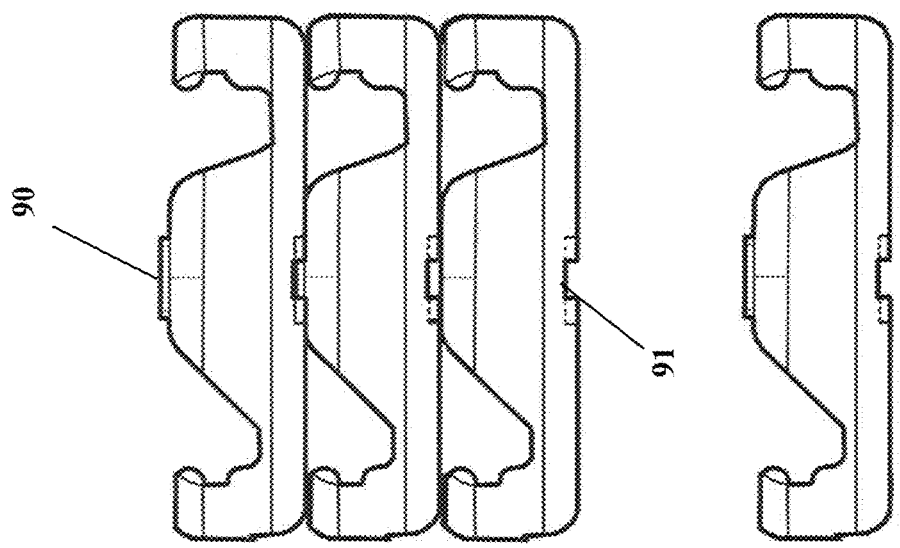

UNIVERSAL SUPPORT STAND FOR PORTABLE ELECTRONIC DEVICES

CROSS REFERENCE TO RELATED APPLICATIONS

None.

BACKGROUND OF THE INVENTION

The present invention relates to a universal stand for uprightly supporting electronic devices having interchangeable attachments that include a light module, a decorative panel or a turntable that allows the device to freely rotate.

DESCRIPTION OF THE PRIOR ART

Tablet computers, wireless phones and other similar portable electronic devices are extremely popular. However, portable electronic devices are typically not equipped with integral support stands for elevating the display screen to a more visible position. Accordingly, the user often holds the device upright, which is burdensome and inconvenient. Otherwise, the device is supported on the user's lap, a desk, a table, or another horizontal support surface where the device is cumbersome to operate and difficult to view.

Though a few aftermarket stands for uprightly supporting a designated electronic device exist in the prior art, they have several limitations. The angle of the electronic device sometimes must be adjusted to account for glare or ambient light conditions, to conceal the screen from those nearby or to satisfy the user's personal preference. However, few, if any, of the conventional aftermarket support stands are angularly adjustable. Furthermore, phones, tablet computers and other electronic devices vary in size, shape, configuration, and dimension. Therefore, each type of electronic device requires a designated, specifically configured support stand that would be unsuitable for any other type of electronic device.

The prior art reveals at least one device that addresses the above-described problems. For example, U.S. Pat. No. 9,605,790 to Alonzo et al. discloses a support stand including a plurality of varying sized and oriented grooves for receiving a select electronic device. Each groove in combination with a sloped inner wall uprightly supports virtually any type of electronic device at a distinct angle relative to an underlying surface. However, as a device is operated while resting in the stand, its battery will be depleted and must be periodically recharged. Most electronic devices include a charging port on a lower edge that is inaccessible when the device is uprightly supported in one of the grooves. Therefore, the device can only be recharged by removing it from the stand, which is burdensome and disrupts a given task. Furthermore, because the device is not adjustable, a user must move the stand to reorient the electronic device. Finally, electronic devices often require additional illumination in order for a user to adequately view a surrounding area.

Accordingly, there is currently a need for a support stand that allows an electronic device to be recharged while being supported thereon. The present addresses this need by including a port that allows a charging cable to be connected to an electronic device while supported within one of the grooves. Furthermore, the device includes interchangeable attachments that allow the device to rotate, support promotional aesthetic elements or illuminate the electronic device.

SUMMARY OF THE INVENTION

The present invention relates to a support stand for portable electronic devices comprising a substantially circular base component having an upper surface, a lower surface and a continuous periphery surrounding a central aperture. Formed on the upper surface are a pair of transverse channels that are each substantially tangential to the central aperture. Within each channel are a plurality of substantially semi-cylindrical grooves, each having an imaginary bisector plane that is at a discrete, oblique angle relative to a vertical plane. Each channel includes an inclined inner wall that, in combination with one of the grooves, uprightly supports a portable electronic device at a distinct angle. Any one of a plurality of interchangeable attachments are securable to the lower surface of the base component that allow the device to rotate, support promotional aesthetic elements or illuminate the electronic device.

It is therefore an object of the present invention to provide a stand that is adapted to support multiple electronic devices at various angles.

It is another object of the present invention to provide a universal support stand that is rotatable and illuminable.

It is yet another object of the present invention to provide a universal support stand that is adapted to accommodate a charging cable while an electronic device is being supported thereon.

Other objects, features, and advantages of the present invention will become readily apparent from the following detailed description of the preferred embodiment when considered with the attached drawings and the appended claims.

BRIEF DESCRIPTION OF THE DRAWINGS

FIG. 12 is a bottom view of another embodiment of the present invention.

FIG. 13 is a top view of the embodiment of FIG. 12.

FIG. 14 depicts multiple units of the embodiment of FIGS. 12 and 13 stacked for storage.

DESCRIPTION OF THE PREFERRED EMBODIMENT

Figure 4:
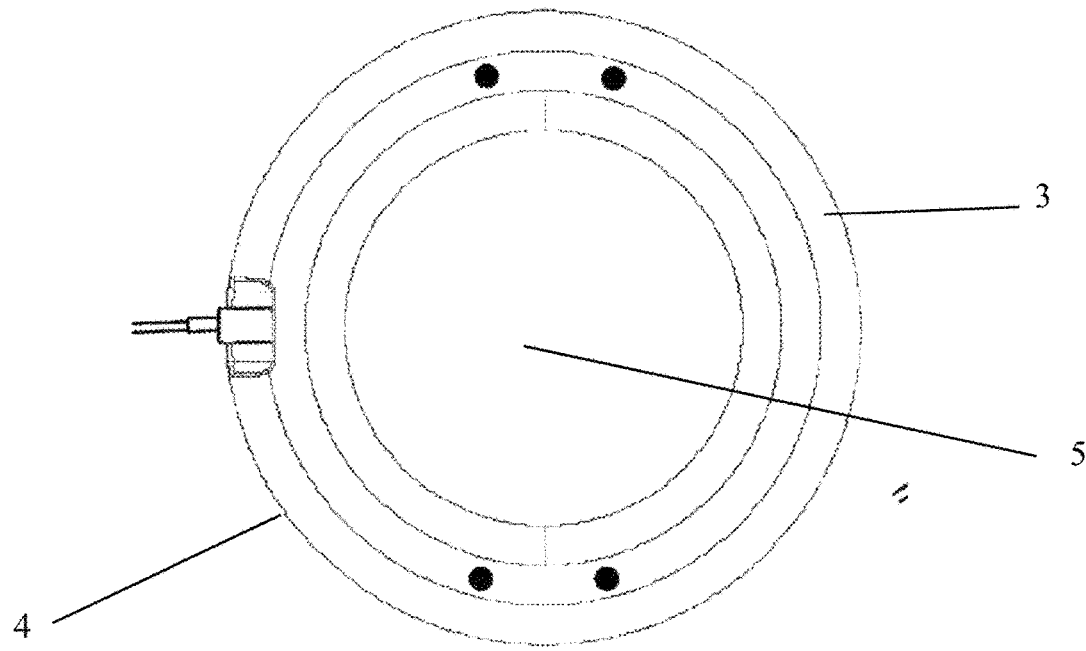
FIG. 4 is a bottom view of the support stand.
Figure 1:
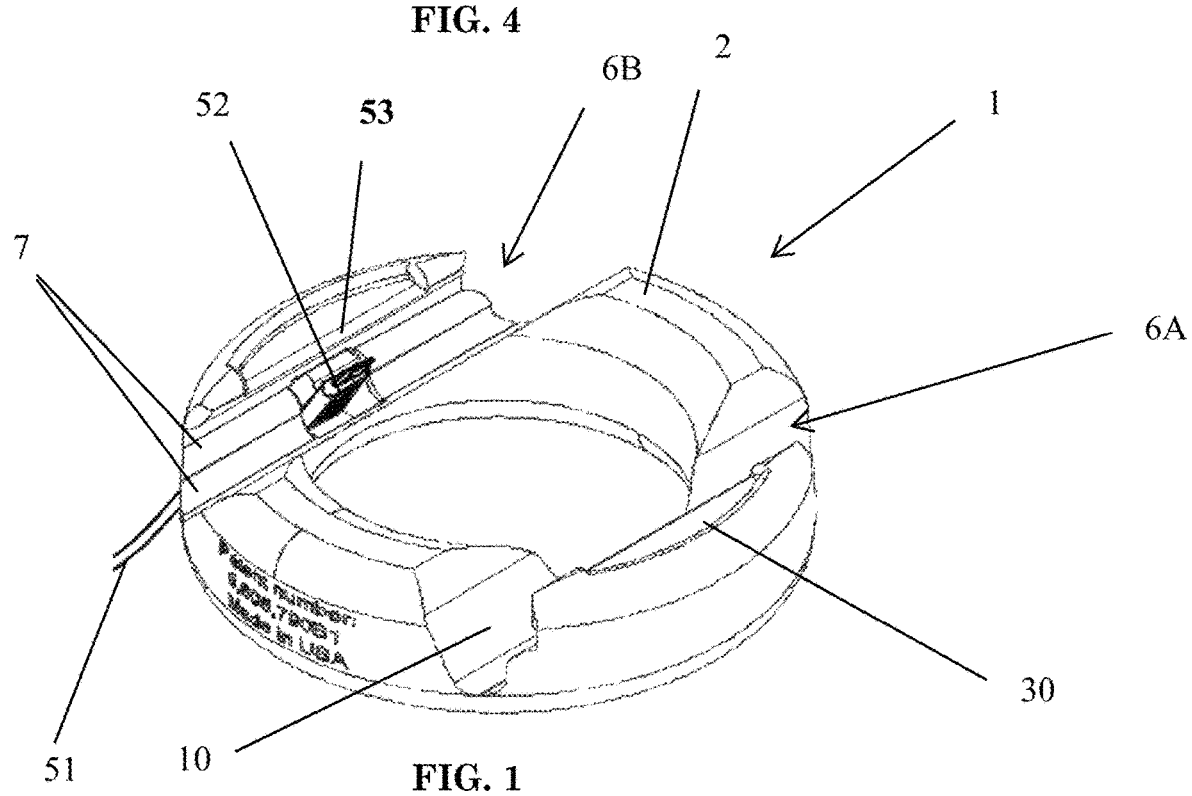
FIG. 1 is an elevated, perspective view of the support stand according to the present invention.
Figure 3:
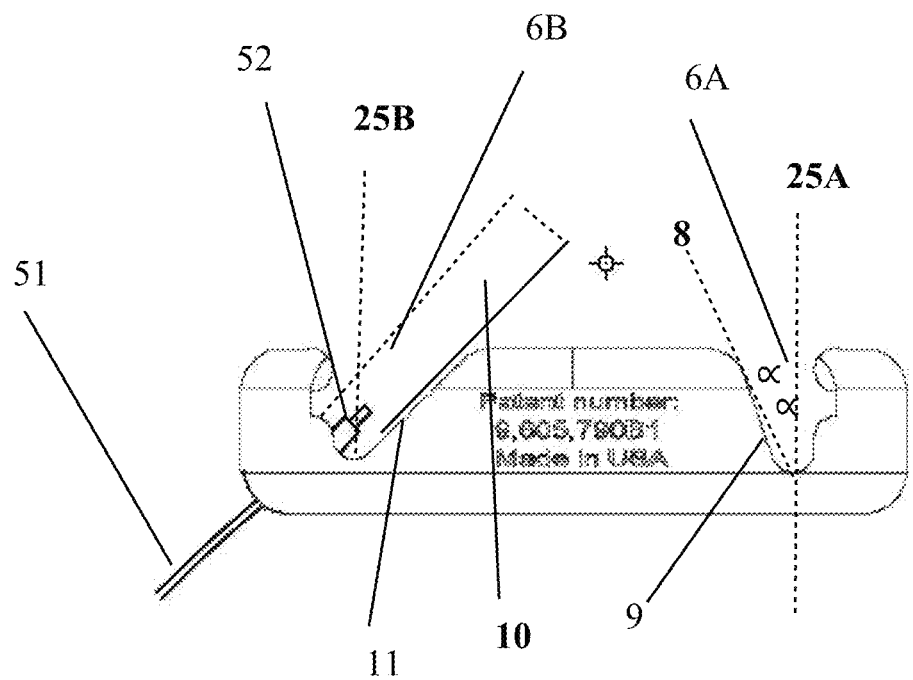
FIG. 3 is a side view of the support stand.
Figure 2:
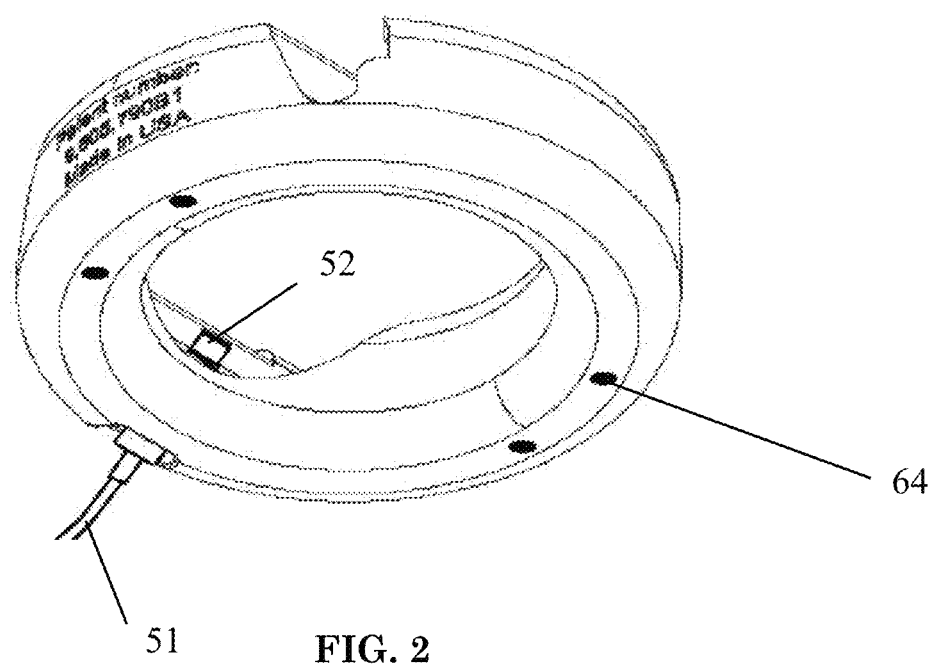
FIG. 2 is a lower, isometric view of the support stand.

Now referring to FIGS. 1-4, the present invention relates to a support stand for portable electronic devices comprising a substantially circular, symmetrical base component 1 having an upper surface 2, a lower surface 3 and a continuous periphery 4 surrounding a central aperture 5. Formed on the upper surface are a pair of opposing, transverse channels 6A, 6B that are each substantially tangential to the central aperture. Within each channel are a plurality of grooves 7, each having a select dimension and angular orientation for receiving the lower edge of a portable electronic device. Each groove is substantially semi-cylindrical having an imaginary bisector plane 8 that is at a discrete, oblique angle ∝ relative to a vertical plane 25A, 25B.

One 6A of the channels includes a sharply inclined inner wall 9 for uprightly supporting a larger electronic device 10, such as that marketed and sold under the trademark iPad™. The opposing channel 6B may have a gradually inclining inner wall 11 to support the electronic device closer to a horizontal plane as opposed to the other inner wall 9. The juxtaposed, angularly varied grooves in combination with either inner wall allow the electronic device to be uprightly supported at any one of several distinct angles.

Angularly extending from the upper end of each inner wall is a platform 12 on which an electronic device rests when supported in a more horizontal position, or if the inclined inner wall is unsuitable. Adjacent each channel, on a side opposite the inner wall, is a ledge 30 that retains an electronic device in a substantially horizontal position when placed in an uppermost groove. The base component is configured as described in U.S. Pat. No. 9,605,790 to Alonzo, the specification of which is incorporated herein by reference.

The present invention represents an improvement over the aforementioned device and is adapted to connect charging cables and interchangeable attachments. Near the lower surface of the base component, beneath the ledge, is a passageway 50 that is dimensioned to accommodate an electronic device charging cable 51 and connector 52. A ramp 53 sloping downwardly from the ledge toward the central aperture includes a thumb trough or depression to facilitate access to the home bar or button on an electronic device resting within one of the grooves.

Figure 5:
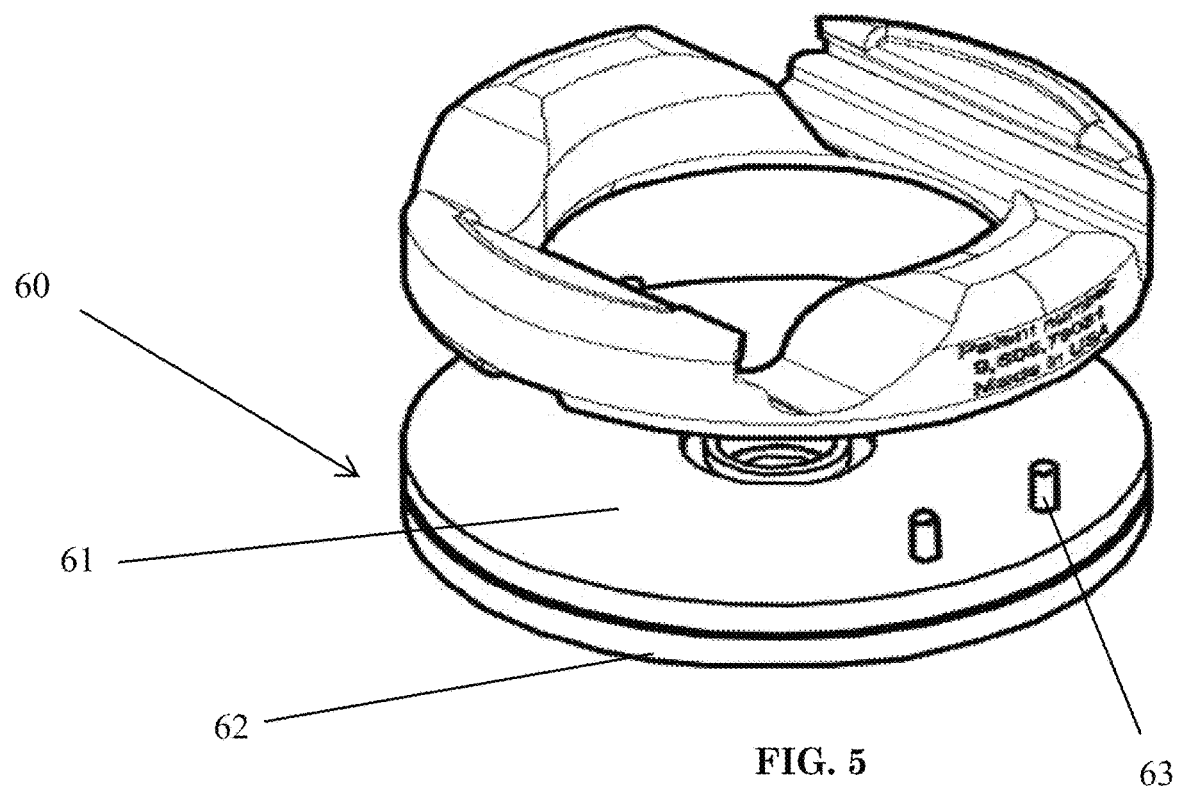
FIG. 5 is a perspective, partially exploded view of the support stand and the first attachment.
Figure 6:
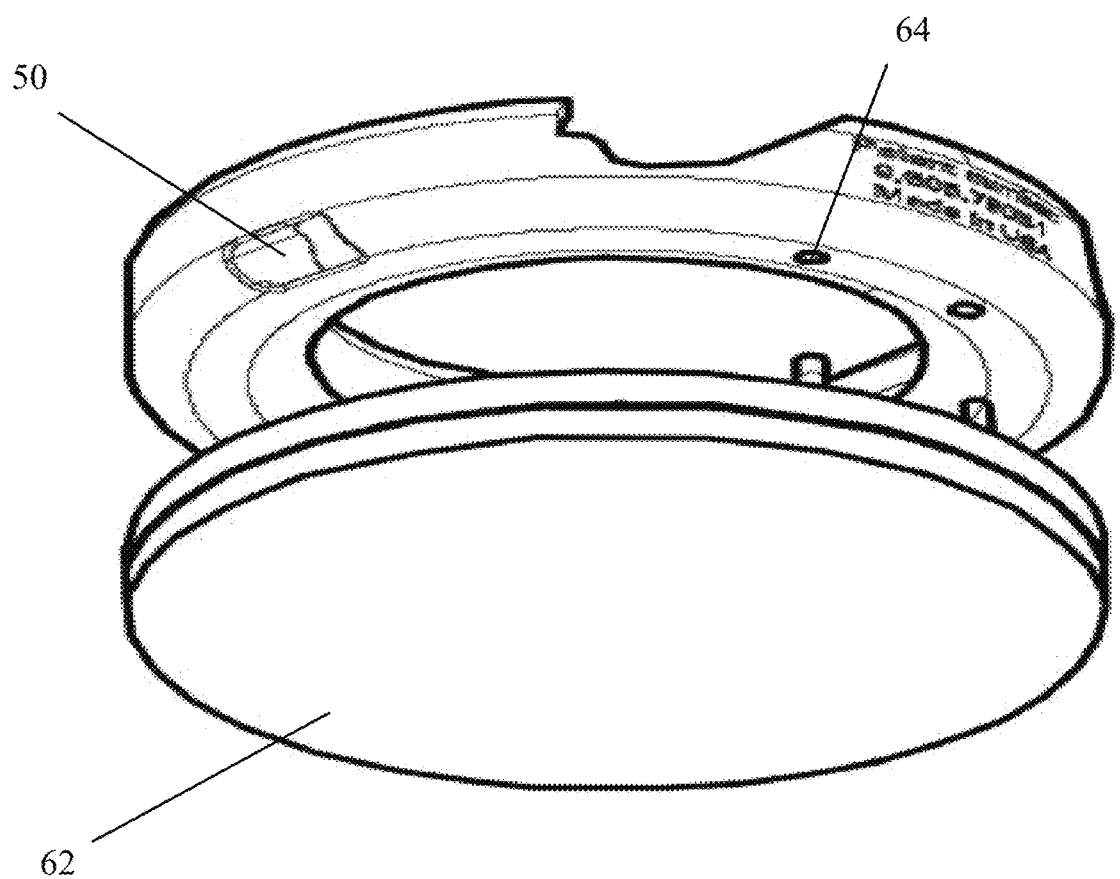
FIG. 6 is a lower, isometric view of the support stand and first attachment.
Figure 7:
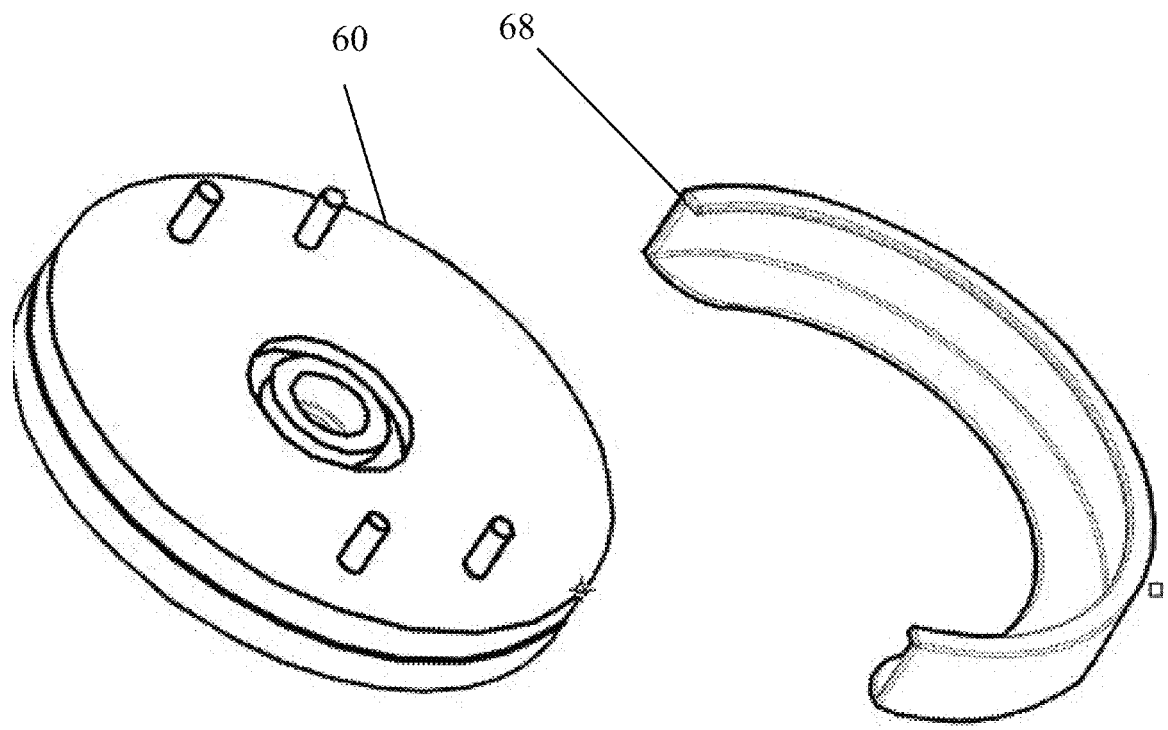
FIG. 7 is an isolated view of the first attachment.

Any one of a plurality of interchangeable attachments can be removably secured to the lower surface of the base component to enhance the device's functionality and operability. Referring specifically to FIGS. 5-7, a first attachment 60 is a turntable mechanism that allows the base component to rotate on an underlying surface to easily reorient a supported electronic device. The attachment 60 includes an upper disc 61 rotatably connected to a lower disc 62 with an axle or similar connector. The top surface of the upper disc includes a plurality of upwardly extending posts 63 that removably seat within mating bores 64 on the lower surface of the base component. Once the electronic device is properly oriented, a user may wish to prevent any further movement. Accordingly, the device includes a locking mechanism formed of a C-clamp 68 that slides over both discs 61, 62 to prevent them from independently rotating.

Figure 9:
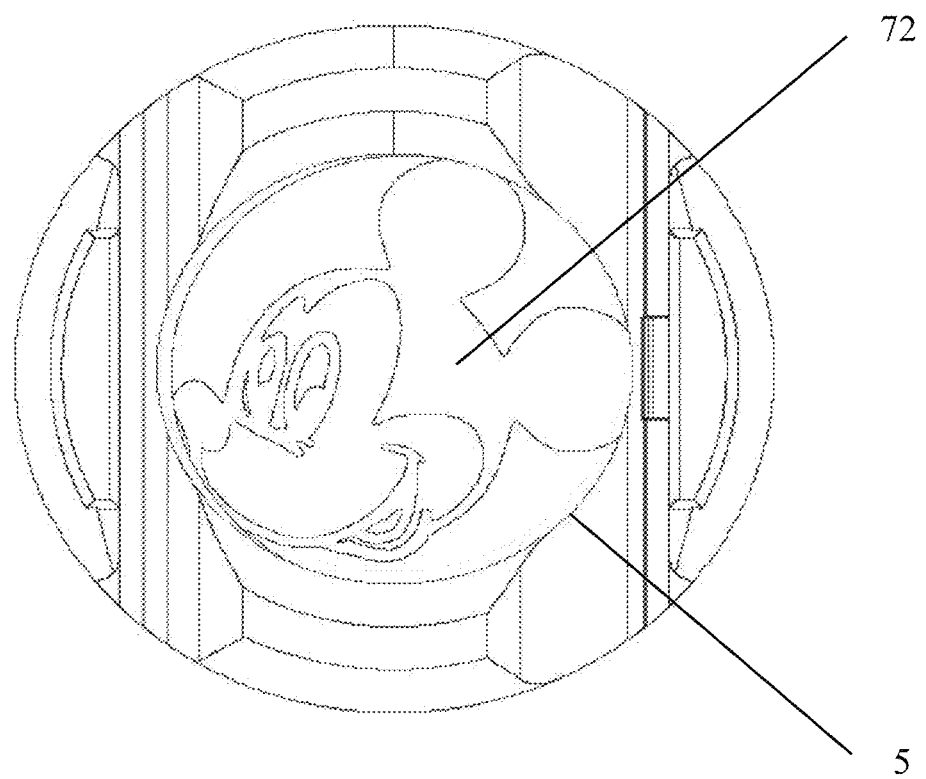
FIG. 9 is a top view of the support stand with the second attachment secured to the base component.
Figure 8:
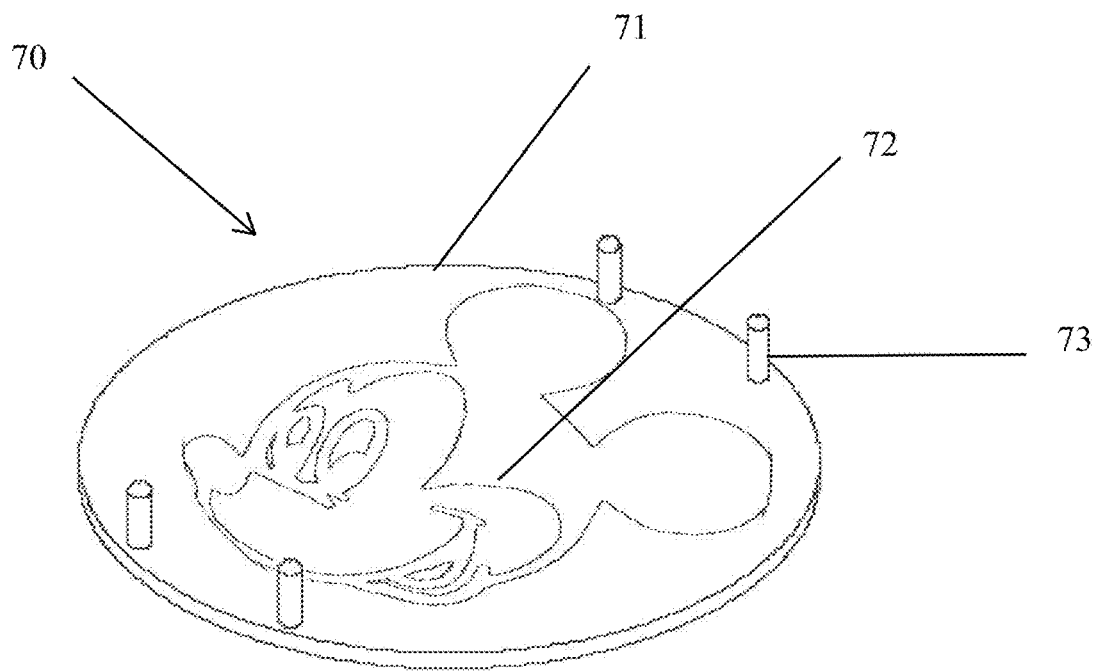
FIG. 8 is an isolated view of the second attachment.

Now referring to FIGS. 8 and 9, a second attachment 70 includes a disc 71 with design elements 72, logos, inspirational messages, advertising, or similar ornamentation on an upper surface that is readily visible though the central aperture 5. The design element could be imprinted or embossed on the upper surface of the disc or could be a decal that is secured with a high-strength adhesive that prevents a user from removing advertising. As such, the disc 71 could include a central depression that receives the advertising decal to further deter removal and to allow another advertisement to be positioned over an existing advertisement. The upper surface of the disc 71 includes support posts 73 that removably seat within the bores 64 on the base component. The disc 71 also functions as a footpad to stabilize the device on an underlying surface.

Figure 10:
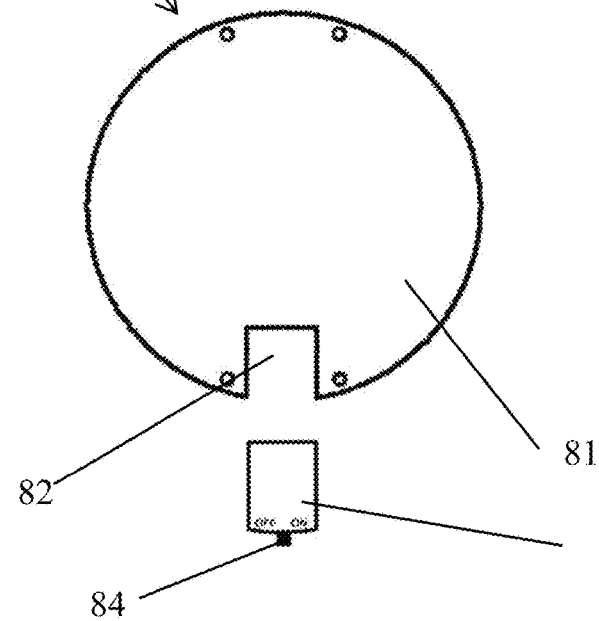
FIG. 10 is a top, plan view of the third attachment.
Figure 11:
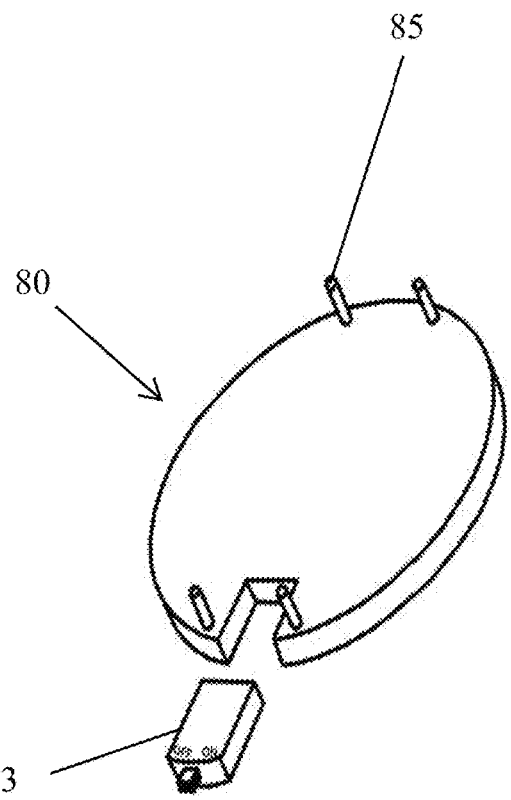
FIG. 11 is a top, perspective view of the third attachment.

Now referring to FIGS. 10 and 11, a third attachment 80 is a light unit for illuminating electronic devices supported on the base component. The third attachment 80 includes a disc 81 having a peripheral notch 82 that removably receives a light module 83 including a casing having an inner edge and an outer edge. The outer edge includes a switch 84 for activating an internal LED that projects light through a lens on the inner edge of the casing and toward a central portion of the disc. The third attachment 80 likewise includes posts 85 for coupling with the bores 64. A design element 72 could be imprinted or otherwise positioned on the disc 81, which is accentuated by the light. Any of the above-described discs could include a frictional lower surface for anchoring the support stand and electronic device on an underlying surface.

Now referring to FIGS. 12-14, the base unit may include one or more protrusions 90 on the upper surface that are inserted into mating receptacles 91 on the lower surface of a second support stand to seamlessly stack multiple units for storage as depicted in FIG. 14. Preferably each receptacle is positioned between a pair of bores as depicted in FIG. 12. The protrusions and receptacles may be ovate, round, cylindrical, square, rectangular or any other shape.

As is readily apparent from the detailed description set forth above, virtually any portable electronic device may be uprightly supported at a desired angle by using any one of the grooves in combination with one of the inner walls, ledges, or platforms. Furthermore, the large, central aperture significantly reduces the necessary materials of construction to form a lightweight stand that is easily transported and stored. However, the low-profile, symmetrical design of the base component creates a ballasting effect when an electronic device is uprightly supported therein. The stand can also project light, display ornamental designs and advertisements, or rotate if a user desires. Furthermore, if the base component is inverted, any of the attachments form a coaster for supporting a desired beverage container. Therefore, the lower surface of each disc may include a layer of porous material for absorbing condensation or a spilled beverage. If the light attachment is used, a supported beverage could be illuminated to create a unique presentation.

The above-described device is not limited to the exact details of construction and enumeration of parts provided herein. For example, though the grooves and channels are primarily depicted and described as being semi-cylindrical and the base component circular, any other shape or configuration that achieves the results described herein may also be used. Furthermore, the size, shape and materials of construction of the various other components can also be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A universal support stand for a portable electronic device comprising:
   a base component having an upper surface, a lower surface and a periphery;
   at least one transverse channel formed on the upper surface of said base component, said transverse channel having a plurality of grooves therein, each of said grooves dimensioned and configured to receive an edge of a portable electronic device to uprightly support said electronic device within said channel; said channel further including an inclined inner wall and a platform angularly extending from an upper end thereof that uprightly support a portable electronic device positioned within at least one of said grooves;

an attachment removably secured to the lower surface of the base component for stabilizing said base component on an underlying surface.

2. The universal support stand according to claim 1 wherein said attachment is a turntable that allows said base component to rotate on the underlying surface.

3. The universal support stand according to claim 1 wherein said base component has a central aperture.

4. The universal support stand according to claim 3 wherein said attachment is a disc with ornamentation on an upper surface that is readily visible though the central aperture.

5. The universal support stand according to claim 1 wherein said attachment is a light unit for illuminating electronic devices supported on the base component.

6. The universal support stand according to claim 1 wherein said light unit comprises:
a disc having a peripheral notch;
a light module removably received within said notch.

7. The universal support stand according to claim 1 wherein said attachment includes support posts that removably seat within bores on the lower surface of said base component.

8. The universal support stand according to claim 1 wherein each of said grooves is at a discrete angle relative to a vertical plane to uprightly support the portable electronic device at a distinct angle.

9. The support stand according to claim 1 wherein said base component is substantially circular.

10. The support stand according to claim 1 further a comprising a second channel formed on the upper surface of said base component, said second channel having a plurality of grooves therein, each of said grooves dimensioned and configured to receive an edge of a portable electronic device to uprightly support said electronic device within said second channel.

11. The support stand according to claim 10 wherein each of said grooves in said second channel is at a discrete angle relative to a vertical plane to uprightly support the portable electronic device at a distinct angle.

12. The support stand according to claim 10 wherein said at least one transverse channel and said second channel are substantially tangential to opposing portions of the central aperture to allow an electronic device to be supported on either of two sides of said base component.

13. The support stand according to claim 1, further comprising protrusions on the upper surface of said base component that are inserted into mating receptacles on the lower surface of a second base component to seamlessly stack multiple base components for storage.

14. The support stand according to claim 1 further comprising a passageway on said base component in communication with one of said grooves, said passageway dimensioned to accommodate an electronic device charging cable and connector.

15. A universal support stand for a portable electronic device comprising:
a base component having an upper surface, a lower surface, a periphery and a central aperture;
at least one transverse channel formed on the upper surface of said base component, said channel having a plurality of grooves therein, each of said grooves dimensioned and configured to receive an edge of a portable electronic device to uprightly support said electronic device within said channel;
a second channel formed on the upper surface of said base component, said second channel having a plurality of grooves therein, each of said grooves dimensioned and configured to receive an edge of a portable electronic device to uprightly support said electronic device within said second channel;
an attachment removably secured to the lower surface of the base component for stabilizing said base component on an underlying surface.

16. The universal support stand for a portable electronic device according to claim 15 wherein said attachment is either of a turntable that allows said base component to rotate on the underlying surface, a disc with ornamentation on an upper surface, or a light unit for illuminating electronic devices supported on the base component.

17. A universal support stand for a portable electronic device comprising:
a base component having an upper surface, a lower surface and a periphery;
at least one transverse channel formed on the upper surface of said base component, said channel having a plurality of grooves therein, each of said grooves dimensioned and configured to receive an edge of a portable electronic device to uprightly support said electronic device within said channel;
protrusions on the upper surface of said base component that are inserted into mating receptacles on the lower surface of a second base component to seamlessly stack multiple base components for storage;
an attachment removably secured to the lower surface of the base component for stabilizing said base component on an underlying surface.

* * * * *